United States Patent [19]

Kimura et al.

[11] 4,009,237
[45] Feb. 22, 1977

[54] PROCESS FOR PRODUCING SHAPED SYNTHETIC RESIN ARTICLES VARYING IN SHAPE OF LONGITUDINAL SECTION

[75] Inventors: Takashi Kimura, Nishinomiya; Giichi Kawashima, Kyoto; Minoru Nagami, Takatsuki; Minoru Hanada, Amagasaki, all of Japan

[73] Assignee: Sumitomo Bakelite Company, Limited, Tokyo, Japan

[22] Filed: June 9, 1975

[21] Appl. No.: 584,877

[30] Foreign Application Priority Data

June 14, 1974 Japan .............................. 49-67194

[52] U.S. Cl. .......................... 264/46.3; 264/46.7; 264/48; 264/145; 264/163; 264/167; 264/210 R; 264/321
[51] Int. Cl.² .................. B29D 27/00; B29F 3/012
[58] Field of Search ............... 264/210 R, 167, 163, 264/151, 145, 146, 251, 51, 53, 48, 54, 99, 96, 153, 284, 297, 46.1, 46.3, 46.7, 161, 321; 425/4, DIG. 817

[56] References Cited

UNITED STATES PATENTS

| | | | |
|---|---|---|---|
| 1,610,295 | 12/1926 | Latham | 264/153 |
| 1,891,744 | 12/1932 | Blair | 264/210 R |
| 2,026,754 | 1/1936 | Stafford | 264/146 |
| 2,366,932 | 1/1945 | Plebanek | 264/251 |
| 2,593,469 | 4/1952 | Mason | 264/167 |
| 2,779,387 | 1/1957 | Schairer | 264/146 |
| 2,905,972 | 9/1959 | Aykanian et al. | 264/53 |
| 3,280,847 | 10/1966 | Chisholm et al. | 264/230 |
| 3,524,922 | 8/1970 | Johnson | 264/145 |
| 3,538,209 | 11/1970 | Hegler | 264/99 |

Primary Examiner—Jeffery R. Thurlow
Attorney, Agent, or Firm—Karl W. Flock

[57] ABSTRACT

A shaped synthetic resin article varying in cross-sectional area and shape of longitudinal section along at least a part of the length is continuously produced by introducing a molten synthetic resin composition, extruded from an extruder die, between at least one pair of rolls rotating in the direction of extrusion so that the rolls of each pair contact each other on their periphery, the peripheral surfaces of the rolls being engraved so as to form a cavity corresponding to the shape of said shaped article when the rolls of each pair contact each other while being rotated, in which cavity the molten resin composition is remolded into an article having the desired shape and at the same time the surplus resin composition overflowing from said cavity is cut off by the edges of said rolls contacting each other, and then cooling the molded article to solidify the same. According to the above process, the diameter of the minimum cross-section of the article can be made much smaller than the outer diameter of the die or nozzle.

3 Claims, 6 Drawing Figures

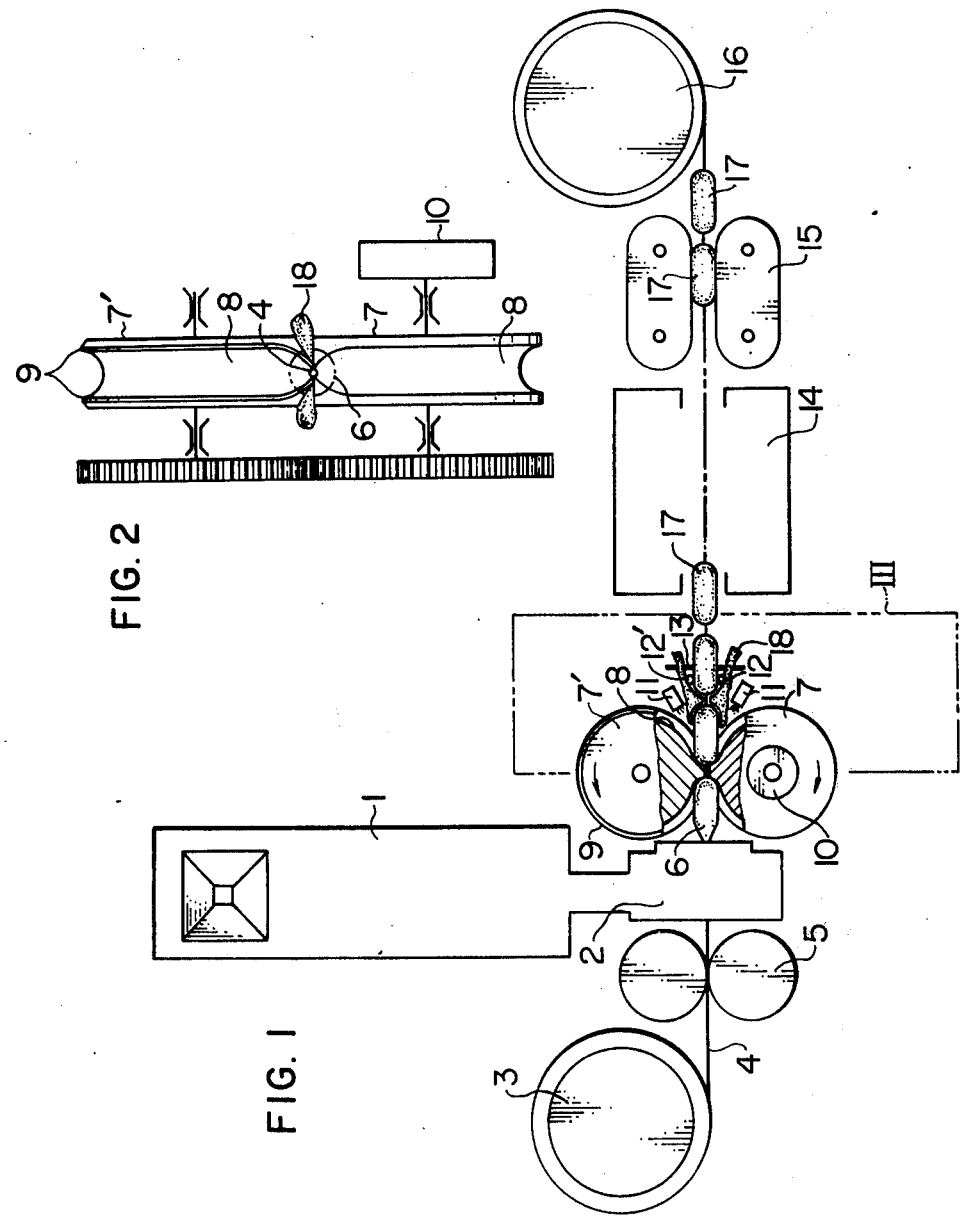

PROCESS FOR PRODUCING SHAPED SYNTHETIC RESIN ARTICLES VARYING IN SHAPE OF LONGITUDINAL SECTION

This invention relates to a process for continuously producing, by extrusion-molding, a shaped synthetic resin article varying in cross-sectional area and shape of longitudinal section along at least a part of the length.

The production of a shaped article varying in shape of longitudinal section along the length is generally effected by a molding method, a representative of which is an injection molding. Such a method, however, cannot be used in the continuous production of articles of extended length.

On the other hand, although the extrusion molding method is suitable for the continuous production of articles of extended length having a uniform shape of longitudinal section, a n article of extended length varying in shape of longitudinal section cannot be produced by a conventional extrusion-molding method, and various attempts have been made to modify such method.

The most common example of such a modification, as seen in the production of a corrugated pipe, is a method by which a plurality of split molds that can embrace the extrusion die or a nozzle attached thereto and move continuously in the direction of extrusion, are filled with a synthetic resin extruded from the die or nozzle, and the resin is molded therein. However, because the split mold is so constructed as to embrace the die or nozzle, such a method has a fundamental disadavantage of being unable to produce an extrusion-molded article having a cross section diameter smaller than the outer diameter of the die or nozzle, Moreover, such an equipment is expensive.

Another attempt was made to vary intermittently the rate of extrusion, but was not successful in obtaining a shaped article having a shape variation along its length.

An object of this invention is to overcome the above-mentioned difficulties and provide a process for continuously producing, by extrusion-molding a shaped synthetic resin article varying in cross-sectional area and the shape of its longitudinal cross-section along at least a part of the length and, if necessary, having a minimum diameter of the cross section much smaller than the outer diameter of the die or nozzle from which the resin is extruded.

Other objects and advantages of this invention will become apparent from the following description.

According to this invention, there is provided a process for continuously producing a shaped synthetic resin article varying in cross-sectional area and shape of its longitudinal section along at least a part of its length, which comprises introducing a molten synthetic resin composition extruded from an extruded die between at least one pair of rolls rotating in the direction of extrusion so that the rolls of each pair contact each other on their periphery, the peripheral surface of each of the rolls being engraved so as to form a cavity corresponding to the shape of said shaped article when the rolls of each pair contact each other while being rotated, in which cavity the molten resin is remolded into an article having the desired shape and, at the same time, the surplus resin composition overflowing the cavity is cut off by the sharp edges of said rolls contacting each other, and then cooling the molded article to solidify the same.

In order to cut off smoothly the surplus resin composition squeezed out of the cavity formed between the rolls while remolding the molten resin composition in said cavity, it is necessary that the edges of one of the pair of rolls have a knife edge shape having an edge-width of 1 mm or less. Further, in order to make provision against the posssible occurrence of imperfect removal of the surplus resin composition owing to cavity edges partly worn or chipped during a long continued running of the rolls, it is very effective to install behind the rolls at least a pair of fine flexible metal rods which can freely swing corresponding to the shape of the molded article while being kept in contact with the surfaces of the molded article from which the surplus resin composition is removed. In this way, any surplus resin composition remaining on the molded article due to insufficient cutting off may be removed to ensure a steady molding operation. The flexible metal rod is preferably kept in contact with the molded article as firmly as possible unless the article is injured. The metal rod, therefore, should be properly selected according to the type of resin, expansion ratio, etc.

The synthetic resin compositions used in this invention may be thermoplastic resin compositions including homopolymers, copolymers, expandable types thereof, etc., and phenolic resin compositions. These resin compositions may contain customary additives such as blowing agents, fillers, curing agents, etc.

When an expandable resin composition is used, the molded resin composition should be cooled to allow the surface layer to solidify immediately after having been remolded in the cavity formed between the rolls, because otherwise the remolded article from the cavity will continue to expand owing to the gas resulting from the decomposition of the foaming agent, with puncturing of the skin of the article or rejoining of the article with the surplus resin which has been cut off.

A common cooling method which utilizes either a cooling tank in which the shaping rolls are installed or a spray ring which delivers a cooling shower is not desirable because of difficulties in the handling of the surplus resin cut off from the molded article and in operation of the process. The present inventors have found after various trials that an effective way for cooling without the above difficulties is to blow air at a temperature of 20° C or lower or a mixture of air and water against the molded extrudate immediately after it emerges from the shaping rolls. When air is used as the sole cooling medium, it is preferable that the temperature of the air is 20° C or lower. If the air temperature exceeds 20° C, cooling becomes inefficient and the aforesaid troubles cannot be completely overcome. A mixtue of air and water is more effective than air alone because of the cooling effect due to the latent heat of vaporization of the water.

Examples of the suitable synthetic resins molded by the present process include polyolefins such as polyethylene, polypropylene, and the like; copolymers of olefins with other compounds such as ethylene-vinyl acetate copolymer, ethylene-acrylic acid copolymer, ethylene-vinyl chloride copolymer, and the like; rigid or plasticized vinyl chloride resins; vinyl chloridevinyl acetate copolymers; styrene resins, styrene-acrylonitrile resins; styrene-acrylonitrile-butadiene copolymers; acrylic resins; and phenolic resins of the Novolak type.

Since according to this invention, the surfaces of the pair of rolls can be engraved to form a cavity of any shape and any dimension and the surplus resin overflowing from the cavity can be cut off by the edges of the cavity, there can be produced continuously and at a high speed shaped articles having any desired shape of longitudinal section and a very small minimum cross-sectional area regardless of the diameter of the die. When a shaped article having high strength and varying in shape of longitudinal section along the length is required, it can be obtained by covering a core material such as strand, rope, metallic or wooden rod or pipe with a synthetic resin by means of a crosshead die or an offset die according to the process of this invention.

The shaped article varying in shape of longitudinal section obtained according to this invention as described above, can be used in such fields as a float-carrying rope for fishing-nets, furniture, interior furnishings, and parts thereof; parts of weak-current electric utensiles, and architectural materials.

As an embodiment of this invention, a process for producing a flexible, float-carrying rope for fishing-nets, in which a rope is covered with a foamed polyethylene, and larger diameter portions and small diameter portions are arranged alternately along its length, is illustrated below with reference to the accompanying drawings, in which FIG. 1 is a plan view of an apparatus for producing a float-carrying rope for fishing-net, which is an embodiment of this invention (rolls 7 and 7' are shown in front view, turned 90° from the actual constructional position, in order to show the sectional construction thereof);

FIG. 2 is a left-side view of the portion of the pair of rolls between which a cavity corresponding to the shape of the final shaped article is formed by engraving the peripheral surfaces of the rolls;

Figure 3:
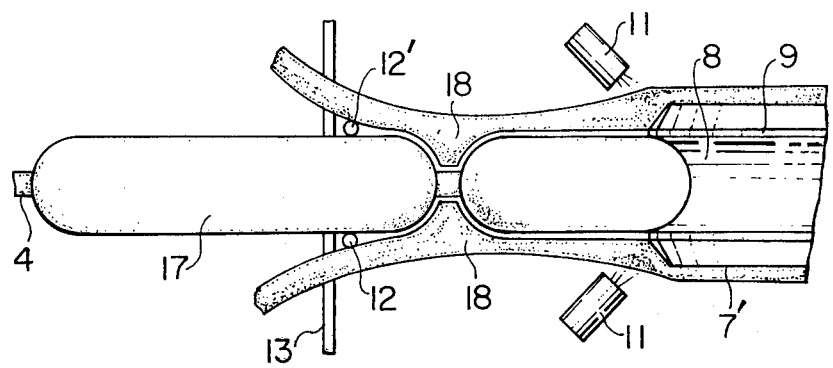
FIG. 3 is an enlarged plan view of the area III in FIG. 1.
Figure 4:
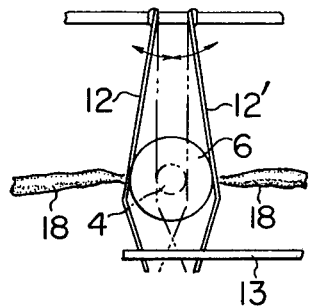
Figure 5A:
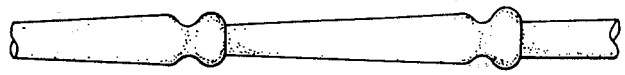
Figure 5B:
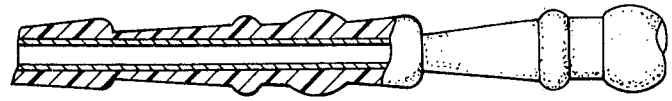

FIG. 4 is a left-side view of the portion shown in FIG. 3, both FIGS. 3 and 4 showing the location of a pair of piano wires which can swing while being kept in contact with the molded article to cut off completely the surplus resin and the location of a fixture to prevent the piano wires from moving in the extrusion direction (in FIG. 3, the extrudate moves from the right to the left and in FIG. 4, the extrudate moves from the back side of the paper carrying the drawing to the front side); and FIGS. 5a and 5b show two types of furniture legs obtained by the process of this invention, FIG. 5a being of a resin alone and FIG. 5b being a partial-sectional view showing that the leg is reinforced by a metal pipe. The molded legs shown in FIGS. 5a and 5b can be cut apart at each cycle of the shape to mass-produce furniture legs.

In FIGS. 1 and 2, 1 is an extruder; 2 a cross-head having a hole for passing a rope 4 through the in-die; 3 a drum about which the rope 4 is wound; 4 the rope, which is made of polypropylene; 5 a brakedrum for maintaining the rope under a constant tension; and 6 a foamed polyethylene extruded from the die while covering the rope therewith.

In FIGS. 1 and 2, 7 and 7' are a pair of rolls, the peripheral surfaces of which are engraved so as to form at least one cavity 8 corresponding to the shape of the desired shaped article, and the edges 9 of the cavity on one of the rolls, namely, the roll 7' in FIG. 2, have a sharp knife edge shape having a width of 0.5 mm for cutting off the surplus resin 18 overflowing from the cavity. The pair of rolls 7 and 7' are rotated by a driving means 10 in the extrusion direction so as to contact each other on their periphery, whereby a cavity is formed between the rolls. The peripheral speeds of both rolls is the same as the speed of extrusion.

In FIGS. 1, 3 and 4, 11 is a spray-gun to cool immediately the foamed resin remolded in said cavity; 12 and 12' are pieces of piano wire, 1 mm in diameter, which can swing corresponding to the shape of the molded article while being kept in contact with the surfaces of the molded article from which the surplus resins have been cut off; and 13 is a fixture to prevent the pieces of piano wire from moving in the extrusion direction with the molded article 17.

In FIG. 1, 14 is a cooling water tank; 15 a take-off unit; and 16 a drum for winding-up the molded extrudate.

The molten expandable polyethylene composition is sent to the cross-head 2 by the extruder 1, in which the rope 4 travelling from the drum 3 via the brake drum 5 is covered with said resin composition. The molten resin composition is expanded upon leaving the cross-head die 2. Before being cooled and solidified the expanded polyethylene composition 6 with which the rope 4 has been covered is introduced between a pair of rolls 7 and 7' installed between the cross-head die 2 and the cooling water tank 14. The peripheral surfaces of the rolls 7 and 7' are engraved so as to form the cavity 8 for imparting the desired shape to the extrudate. These rolls are rotated in the extrusion direction by the driving means 10, while contacting each other on their periphery.

Since the expanded polyethylene composition 6 with which the rope 4 has been covered is still in a very soft state, it is easily deformed to conform to the contour of the cavity 8 formed between the rolls 7 and 7' and, at the same time, the surplus resin composition 18 overflowing the cavity 8, i.e., the so-called flash, is cut off from the molded article by means of the cavity edges 9 having a sharp knife edge shape provided along the periphery of the roll 7', resulting in the desired molded article 17. If not sufficiently cooled, the molded article 17 will be susceptible to such troubles as deformation, punctured skin, or rejoining with the flash cut off. To avoid such troubles, the molded article 17 formed by passing the expanded resin composition 6 through between the rolls 7 and 7' is immediately cooled with an air-water mixture blow from a spray-gun 11.

The molded article 17 with which the rope has been covered is driven forward while the surfaces of the article from which the surplus resin has been cut off, are contacted with a pair of piano wires 12 and 12' located near and behind the rolls 7 and 7'. Since the piano wires 12 and 12 are flexible enough to be always kept in contact with the surfaces of the molded article 17 from which the surplus resin 18 has been cut off, it is possible to remove any surplus resin remaining on the molded article by the scraping action of these wires even if the surplus resin 18 has not been removed completely owing to wear or chipping of the cavity edges 9. There is also provided a stopper 13 to prevent the piano wires 12 and 12' from being dragged along with the moving of the molded article 17 and prevent the scraping effect from being reduced.

The molded article 17 then enters a cooling water tank 14, where it is cooled to solidify and continues to advance by way of a take-off unit 15 until it is wound up together with the rope 4 by the winding-up drum 16.

The present invention should not be interpreted to be limited to the above-mentioned embodiment.

In carrying out the present process, it is also possible to subject the molded article to a post-treatment such as embossing by use of pairs of rolls arranged in series or to set up multiple production lines by use of pairs of rolls arranged in parallel or a pair of rolls, the peripheral surfaces of which are engraved to form a plurality of cavities in parallel or in series.

It is advantageous for a long uninterrupted run to internally cool the rolls with water by a jacket system to keep the rolls from an excessive temperature rise.

According to this invention, it is possible to produce continuously a synthetic resin shaped article having any shape of longitudinal section and with very small minimum cross sectional area independent of the diameter of die.

What is claimed is:

1. A process for the continuous production of a shaped synthetic resin article varying in cross-sectional area and in its shape of longitudinal cross section along at least a part of its length, which comprises extruding a molten polyethylene resin composition from an extruder die as an expanded polyethylene about a rope and between a pair of rolls rotating in the direction of extrusion so that the rolls of each pair contact each other on their periphery, the peripheral surfaces of the rolls being engraved so as to form a cavity into which the extrusion takes place and corresponding to the shape of said shaped article when the rolls contact each other while being rotated, remolding in said cavity the expanded molten resin composition into an article having the desired shape, and at the same time, cutting off the surplus resin overflowing from said cavity by the edges of said cavity on the rolls, the edges of the cavity on one of the pair of rolls having a knife edge shape having an edge-width of 1 mm or less, and then immediately quenching the thus molded article to solidify the same by blowing air or a mixture of air and water at 20° C or lower against the article.

2. A process according to claim 1, wherein the surplus resin remaining on the molded article which has not been cut off during the remolding in the cavity is removed by scraping with at least one pair of fine flexible metal rods which are located behind the rolls and can freely swing while being kept in contact with the surfaces of the molded article from which most of the surplus resin composition has been cut off.

3. A process according to claim 1, wherein a rope is covered with the extruded molten polyethylene resin composition at regular intervals.

* * * * *